United States Patent Office 3,477,969
Patented Nov. 11, 1969

3,477,969
COATING COMPOSITION OF A METHACRYLATE POLYMER/CELLULOSE ACETATE BUTYRATE/ SUCROSE BENZOATE
Fred W. Parker, Flint, Mich., assignor to E. I. du Pont de Nemours and Company, Wilmington, Del., a corporation of Delaware
No Drawing. Filed Dec. 12, 1967, Ser. No. 689,770
Int. Cl. C09d 3/80, 3/14; C08f 15/04
U.S. Cl. 260—17                    11 Claims

ABSTRACT OF THE DISCLOSURE

A coating composition in which the film-forming material comprises:
(a) 60–90% by weight of a methacrylate polymer that has pendent hydroxyl groups, pendent nitrile groups and pendent carboxyl groups;
(b) 20–40% by weight cellulose acetate butyrate;
(c) 2–10% by weight sucrose benzoate; and
(d) 0–10% of an organic plasticizer.

BACKGROUND OF THE INVENTION

This invention relates to coating compositions of methacrylate polymer and, in particular, to a coating composition that has improved water spot resistance and improved resistance to crazing by solvents.

Coatings using methacrylate polymers as the film-forming constituent are well known to have excellent outdoor durability and gloss retention but, unfortunately, are susceptible to water spotting and crazing which limits their useful life.

"Crazing" is a term that refers to minute shallow interconnection fissures at the surface of the coating which frequently develop when the coating is exposed to solvent such as when the coating is patched or refinished with the same or a different coating composition at normal painting temperatures of about 10–40° C.

"Water spotting" is a term that refers to undesirable imperfections left in the surface of the coating when a droplet of water comes into contact with the coating which is at an elevated temperature; for example, water droplets coming into contact with the paint on an auto which has been exposed to the hot sun for long periods of time, can cause water spotting.

These problems have been partially solved by the addition of cellulose acetate butyrate to the methacrylate polymer as is shown in Evans U.S. 2,849,409, issued Aug. 26, 1958. However, a higher degree of water spot resistance and crazing resistance is preferred than is achieved by the addition of cellulose acetate butyrate.

The novel coating composition of this invention has a higher degree of solvent crazing resistance and water spot resistance than was possible with prior art compositions. Therefore, this novel composition is preferred over those prior art compositions which, in themselves, formed excellent coatings and have been widely used, particularly in the auto industry.

STATEMENT OF THE INVENTION

A liquid coating composition that has as the essential film-forming material, a compatible mixture of
(a) 60–90% by weight based on the weight of the film-forming materials in the composition of a methacrylate polymer that has attached to the backbone 0.2–1.2% by weight of said methacrylate polymer of pendent hydroxyl groups, 0.6–3.5% by weight of pendent nitrile groups, and 0.01–2.0% by weight of pendent carboxyl groups;
(b) 20–40% by weight of cellulose acetate butyrate;
(c) 2–10% by weight of sucrose benzoate; and
(d) 0–10% by weight of an organic plasticizer;
the above film-forming ingredients are in a solution of a volatile organic liquid which includes at least one solvent for the film-forming components.

DESCRIPTION OF THE INVENTION

Preferably, about 40–80% by weight, and more preferably, about 55–65% by weight based on the weight of the film-forming materials in the coating composition of a methacrylate polymer having pendent hydroxyl, nitrile and carboxyl groups, is used in the novel coating composition of this invention. The polymer used in the coating composition of this invention has attached to the backbone, preferably about 0.4–1.0% by weight based on the weight of the polymer of pendent hydroxyl groups, about 0.5–1.5% by weight of carboxyl groups and about 0.1–2.0% by weight of pendent nitrile groups.

The methacrylate polymer having the aforementioned hydroxyl, nitrile and carboxyl pendent groups used in this invention, preferably has a glass transition temperature (Tg) of about 50–100° C., and more preferably, a Tg of 60–80° C. This methacrylate polymer preferably has a relative viscosity of about 1.10–1.30, and more preferably, about 1.12–1.20. These relative viscosity ranges correspond to a molecular weight range of about 20,000–200,000 and 55,000–105,000, respectively.

The glass transition temperature of the methacrylate polymer is determined by a thermomechanical analyzer, Model 940, sold by E. I. du Pont de Nemours and Company.

The "relative viscosity" is the value obtained by dividing the efflux time of a solution of the methacrylate polymer by the efflux time of the solvent used to form the above polymer solution. The efflux times are measured according to the procedure of ASTM–D–445–46–T, Method B, using as the polymer solution 0.25 gram of the methacrylate polymer in 50 cubic centimeters of ethylene dichloride as the solvent. The efflux times are measured at 25° C. in a standard apparatus, sold under the designation of a modified Ostwald viscometer.

The above molecular weight figures are the weight average molecular weights calculated from the relative viscosity using a standard calculation well known to one skilled in the polymer art.

The "methacrylate polymers" for making the novel coating composition of this invention have copolymerized therewith minor amounts of nitrile containing monomers, carboxyl containing monomers and hydroxyl containing monomers. These methacrylate polymers contain methyl methacrylate as the main constituent or preferably have polymerized with the methyl methacrylate up to 50% by weight of other copolymerizable lower alkyl monomers of esters of acrylic acid and other esters of methacrylic acid in which the alkyl group contains from about 1–8 carbon atoms. Typical examples of the copolymerizable lower alkyl acrylate esters and methacrylate esters are ethyl acrylate, propyl acrylate, butyl acrylate, 2-ethylhexyl acrylate and the like; ethyl methacrylate, propyl methacrylate, butyl methacrylate, hexyl methacrylate and the like. Other copolymerizable monomers which can be used are acrylonitrile, styrene and vinyl acetate.

To provide the pendent nitrile groups to the methacrylate polymer used to form the novel coating composition of this invention, preferably about 2–15% by weight based on the weight of the methacrylate polymer of a polymerizable nitrile containing monomer, preferably acrylonitrile, is used to form the polymer. More preferably, about 8–10% by weight of acrylonitrile is used.

The pendent carboxyl constituents of the methacrylate polymer used to form the coating composition of this invention are provided by α,β-unsaturated carboxylic acid monomers which are copolymerized with the methacrylate monomers. The methacrylate polymer used in this invention contains about 0.1–3% by weight, and preferably, 0.2–1% by weight, based on the weight of the polymer, of polymerized α,β-unsaturated carboxylic acid units. Typically useful α,β-unsaturated carboxylic acid monomers are methacrylic acid, acrylic acid, itaconic acid, ethylacrylic acid, propylacrylic acid, isopropylacrylic acid and homologues of these acids. Methacrylic acid and acrylic acid are preferred since these acids form particularly high quality polymers.

The pendent hydroxyl groups are supplied to the methacrylate polymers used to make the novel coating composition of this invention by a copolymerizable hydroxy alkyl acrylate or a hydroxyl alkyl methacrylate. Preferably, about 2–20% by weight of the methacrylate polymer, and more preferably, about 5–15% by weight of the methacrylate polymer, of hydroxyalkyl acrylate or methacrylate is used to form the methacrylate polymer used in this invention. Typically useful hydroxyalkyl acrylates and methacrylates contain about 1–8 carbon atoms in the alkyl group and are, for example, hydroxyethyl acrylate, hydroxypropylacrylate, hydroxybutyl acrylate, hydroxyoctyl acrylate, and the like, hydroxymethyl methacrylate, hydroxyethyl methacrylate, hydroxypropyl methacrylate, hydroxybutyl methacrylate, hydroxyhexyl methacrylate, hydroxyoctyl methacrylate, and the like.

About 20–40% by weight, and preferably, about 25–30% by weight, based on the weight on the film-forming material of the coating composition, of cellulose acetate butyrate is used to form the novel coating composition of this invention. Preferably, the cellulose acetate butyrate used in this invention has a viscosity of about 0.1–20.0 seconds and more preferably, a viscosity of 2–5 seconds determined according to the method of ASTM-D–1343–56. Surprisingly, the cellulose acetate butyrate in the above amounts in the coating is miscible and compatible with the methacrylate polymer and forms excellent high quality coatings.

Sucrose benzoate is used in the novel coating composition of this invention in amounts of about 2–10% by weight, based on the weight of the film-forming material in this novel coating composition of this invention. Preferably, about 4–8% by weight of sucrose benzoate is used. The sucrose benzoate surprisingly unexpectedly provides increased resistance to water spotting and solvent crazing to coatings formed from the novel composition of this invention.

Preferably, organic plasticizers in amounts up to 10% by weight, based on the weight of film-forming ingredients, are used in the novel composition of this invention.

More preferably, about 2–8% by weight of organic plasticizer is used which provides a coating composition with excellent durability. Functional polymeric plasticizers which react with the constituents in the coating composition are particularly useful, such as epoxidized soya bean oil, oil free and oil modified alkyds and polyesters, such as, polyorthophthalate esters, polyalkylene adipate esters or polyarylene adipate esters.

Volatile non-functional monomeric plasticizers can also be used, such as benzylbutyl phthalate, dibutyl phthalate, triphenyl phosphate, 2-ethylhexylbenzyl phthalate, dicyclohexyl phthalate, diallyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexyl ester of hexamethylene diphthalate, di(methylcyclohexyl)phthalate. One preferred plasticizer of this group is benzylbutyl phthalate since it forms a coating with excellent balance of properties.

Blends of volatile polymeric plasticizers and nonvolatile plasticizers can be used. Preferably, the weight ratio is about 1:1 of he volatile to non-volatile plasticizer. For example, benzylbutyl phthalate can be used with any of the aforementioned polymeric plasticizers.

Preferably, the novel coating composition of this invention has a solids content of film-forming ingredients of about 20–50% by weight, and more preferably about 30–40% by weight. Examples of the volatile solvents and diluents which are used in formulating the coating compositions of this invention are toluene, xylene, butyl acetate, acetone, methylisobutyl ketone, methylethyl ketone, butyl alcohol, and other aliphatic cycloaliphatic and aromatic hydrocarbons, esters, ethers, ketones, and alcohols, such as are conventionally used in coating compositions. One preferred solvent is a mixture of toluene, methyl isobutyl ketone and methylethyl ketone.

Pigments are used in the novel coating composition of this invention in the amounts of 0.1–20.0% pigment volume concentration, preferably, a pigment volume concentration of about 0.3–6.0% is used. Examples of the great variety of pigments which are used in the novel coating composition of this invention are metallic oxides, preferably titanium dioxide, zinc oxide, and the like, metal hydroxides, metal flakes, chromates, such as lead chromate, sulfides, sulfates, carbonates, carbon black, silica, talc, china clay, organic dyes and lead, iron blues, organic reds, maroons, and the like, organic dyes and lakes, etc.

The novel coating compositions of this invention can be applied to a variety of substrates, for example, wood, glass and metal, by any of the usual application methods, such as spraying, dipping and brushing. These coatings can be air dried or can be baked which minimizes the drying period. The resulting coatings or films can be rubbed or polished in accordance with conventional techniques, if desired, to improve smoothness or apparent gloss or both.

The dried coatings of the compositions of this invention are characterized by increased freedom from water spotting and have excellent craze resistance in combination with outstanding durability and gloss retention. Coatings of this invention also have good gasoline resistance and improved adhesion as compared with conventional methyl methacrylate lacquers. Coating compositions of this invention find particular utility in coating articles which are mass produced and wherein the parts of the articles are precoated prior to assembly. Also, the coating compositions of this invention now make it possible to blend refinished spots or other adjacent or overlapping areas without objectional crazing.

The following examples illustrate this invention. The parts and percentages are by weight unless otherwise specified.

EXAMPLE 1

The coating composition is formed by first preparing the following polymer solution.

| Portion 1: | Parts by weight |
|---|---|
| Toluene | 700 |
| Methylisobutyl ketone | 300 |
| Methylethyl ketone | 228 |
| Methyl methacrylate | 900 |
| Acrylonitrile | 150 |
| Butyl acrylate | 300 |
| Hydroxypropyl methacrylate | 150 |
| Benzoyl peroxide | 4 |
| Methacrylic acid | 3 |
| Portion 2: | |
| Azobisisobutyronitrile | 4 |
| Portion 3: | |
| Toluene | 668 |
| Portion 4: | |
| Methylethyl ketone | 354 |
| Total | 3761 |

Portion 1 is premixed and then charged into a reaction vessel equipped with a thermometer and a stirrer and heated to its reflux temperature of about 98° C., and is held at this temperature for about 3 hours. Portion 2 is then charged into the reaction vessel and the reaction mixture is heated to its reflux temperature of about 90° C. for about 3 hours. Portions 3 and 4 are then charged into the reaction mixtures and this mixture is heated to about 85° C. for about 15 minutes and then slowly cooled to room temperature. The resulting polymer has the following composition: methyl methacrylate/acrylonitrile/butyl acrylate/hydroxypropylmethacrylate/methacrylic acid. The polymer has a Tg of 55° C., a relative viscosity of 1.26 measured according to ASTM–D–44–46–T, Method B.

The resulting polymer solution has an acid number of about 1.6, a polymer solids content of about 36.4% and a relative viscosity of about 1.26.

Two coating compositions, A and B, are formulated from the above polymer solution. Composition A contains the sucrose benzoate additive, while composition B does not contain this additive. The coating compositions are prepared by blending the following ingredients:

| | Parts by weight | |
|---|---|---|
| | Composition A | Composition B |
| Above prepared polymer solution (36.4% polymer solids) | 70 | 70 |
| Cellulose acetate butyrate (2 sec. viscosity measured at 25% polymer solids in a solution of acetone and toluene according to ASTM–D–1343–56) | 48 | 48 |
| Sucrose benzoate solution (60% solids dissolved in 1:1 toluene/acetone solvent) | 8 | 0 |
| Total | 126 | 118 |

Each of the above coating compositions A and B is sprayed onto a steel panel, primed with a 1.5 mil thick iron oxide pigmented epoxidized alkyd resin primer. The sprayed panels are baked for 30 minutes at 150° C., giving a clear, dry coating of about 1.8 mils thick. Each of the above panels is tested for the craze-free temperature[1] and for the water-spot-free temperature.[2]

The craze-free temperature (CFT) tests consist of taking a coated panel and tilting this panel 15° from the horizontal and attaching this panel to a temperature gradient bar having a temperature gradient of 50° F. to 100° F. Thermocouples are placed along the temperature gradient bar which indicate the temperature of the bar at a given point. A drop of methylisobutyl ketone is placed at the lowest temperature point of the panel that is being tested, i.e., 10° F. Drops of solvent are placed on the panel progressing toward the hot end of the panel. The point at which the coating crazes is defined as the craze-free temperature. It is preferred for the coating to have a low craze-free temperature which allows for the use of lower drying temperatures for the coating.

To determine the water-spot-free temperature (WSFT), the same test is used, except the temperature differential is from 100° F. to 200° F. Failure is indicated by a distortion of the film rather than a cracking or crazing of the film.

The craze-free temperature for the coating composition A is 57° F. and for coating composition B, it is 86° F. The water-spot-free temperature for coating composition A is 170° F. and for coating composition B, it is 160° F. The difference between the water-spot-free temperature and the craze-free temperature for coating composition A is 113 and B is 74. The greater difference between the water-spot-free temperature and the craze-free temperature, expressed as $\Delta(WSFT-CFT)$, indicates that coating composition A, containing sucrose benzoate, has superior balance of these two important properties than does coating composition B.

EXAMPLE 2

Six different polymer solutions are formulated using the procedure of Example 1 and each of these polymer solutions are blended with cellulose acetate and sucrose benzoate to form coating compositions C–N. The table attached shows the different coating compositions that are formed.

Each of the above coating compositions is sprayed onto a steel panel, primed as in Example 1, giving about a 1.8 mil thick film after baking for 30 minutes at 150° C. The craze-free temperature (CFT) and the water-spot-free temperature (WSFT) are determined by using the same test procedure as in Example 1 and are given in the table. Each of the coating compositions C–N have an excellent balance of the properties of craze resistance and water-spot resistance as indicated by the large difference between the water-spot-free temperature and the craze-free temperature.

EXAMPLE 3

The following coating composition O is formulated from the polymer solution of Example 1:

| | Parts by weight |
|---|---|
| Polymer solution of Example 1 (36.4% polymer solids) | 60.0 |
| Cellulose acetate butyrate (same as Example 1) | 64.0 |
| Sucrose benzoate solution (60% solids dissolved in 1:1 toluene/acetone solvent) | 12.0 |
| Butylbenzyl phthalate plasticizer | 2.0 |
| 2% by weight silicon solution | 0.2 |
| Ethylene glycol monoethylether acetate | 6.0 |
| Total | 144.2 |

---

[1] "Craze-free temperature" is the lowest temperature at which a drop of methylisobutyl ketone can be evaporated from the finish without producing craze marks.

[2] "Water-spot-free temperature" is the highest temperature of a finish at which a drop of water can be placed without the water leaving a permanent spot on the finish caused by distortion of the paint.

The above ingredients are blended together and the resulting coating composition is sprayed onto a steel panel primed as in Example 1, giving about a 1.8 mil thick film after baking for 30 minutes at 150° C. The craze-free temperature (CFT) and the water-spot-free temperatures (WSFT) are determined by using the same test procedure as in Example 1. This composition has a CFT and WSFT similar to coating composition A of Example 1 and exhibits an excellent balance of these two important properties.

TABLE I.—RELATIVE VISCOSITY

| Coating compositions | $T_g$ | C | D | E | F | G | H | I | J | K | L | M | N |
|---|---|---|---|---|---|---|---|---|---|---|---|---|---|
| Polymer Solutions (30% Polymer Solids): | | | | | | | | | | | | | |
| MMA/AN/BA/HPMA/MAA 59/10/20/10/1 | 59 | 40 | | | | | | | 40 | | | | |
| MMA/AN/BMA/HPMA/MAA 39/10/40/10/1 | 65 | | 40 | | | | | | | 40 | | | |
| MMA/AN/BMA/HPMA/MAA 38/10/40/10/2 | 69 | | | 40 | | | | | | | 40 | | |
| MMA/AN/BA/HPMA/MAA 58/10/20/10/2 | 62 | | | | 40 | | | | | | | 40 | |
| MMA/AN/BA/HPMA/MAA 60/10/20/9.7/0.3 | 55 | | | | | 40 | | | | | | | 40 |
| MMA/AN/BMA/HPMA/MAA 40/10/40/9.7/0.3 | 62 | | | | | | 40 | | | | | | 40 |
| Cellulose acetate butyrate (Same as Ex. 1) | | 16 | 16 | 16 | 16 | 16 | 16 | 42 | 42 | 42 | 42 | 42 | 42 |
| Sucrose Benzoate (Same as Ex. 1) | | 3 | 3 | 3 | 3 | 3 | 3 | 5 | 5 | 5 | 5 | 5 | 5 |
| Ethylene Glycol Monoethylether acetate | | 10 | 10 | 10 | 10 | 10 | 10 | 20 | 20 | 20 | 20 | 20 | 20 |
| Craze-Free Temperature (CFT) (° F.) | | 79 | 82 | 79 | 93 | 75 | 82 | 67 | 70 | 63 | 91 | 58 | 77 |
| Water-Spot-Free Temperature (WSFT) (° F.) | | 162 | 159 | 158 | 172 | 150 | 146 | 172 | 172 | 170 | 172 | 168 | 100 |
| (WSFT−CFT) | | 83 | 67 | 79 | 79 | 75 | 64 | 105 | 100 | 107 | 81 | 110 | 93 |

EXAMPLE 4

The following coating composition P is formulated from the polymer of Example 1:

| | Parts by weight |
|---|---|
| Polymer solution of Example 1 (36.4% polymer solids) | 60.0 |
| Cellulose acetate butyrate (same as Example 1) | 64.0 |
| Sucrose benzoate solution (60% solids dissolved in 1:1 toluene/acetone solvent) | 12.0 |
| Non-volatile polymeric plasticizer solution—(70% polymer solids of a coconut oil ethyleneglycol alkyd having a Gardner Holdt solution viscosity of A–B) | 3.0 |
| 2% silicone solution | 0.2 |
| Ethyleneglycol mono-ethylether acetate | 6.0 |
| Total | 145.2 |

The above ingredients are blended together and the resulting coating composition is sprayed onto a steel panel primed as in Example 1, giving about a 1.8 mil thick film after baking for 30 minutes at 150° C. The craze-free temperature (CFT) and the water-spot-free temperatures (WSFT) are determined by using the same test procedure as in Example 1. This composition has a CFT and WSFT similar to coating composition A of Example 1 and exhibits an excellent balance of these two important properties.

EXAMPLE 5

The following coating composition Q is formulated from the polymer solution of Example 1:

| | Parts by weight |
|---|---|
| Polymer solution of Example 1 (36.4% polymer solids) | 80 |
| Cellulose acetate butyrate (same as Example 1) | 32 |
| Butylbenzyl phthalate | 2 |
| Paraplex G–30 (a low molecular weight polymeric plasticizer in which the polymer is believed to be an orthophthalate ester) | 2 |
| Sucrose benzoate solution (same as Example 4) | 8 |
| Total | 124 |

The above ingredients are blended together and the resulting coating composition is sprayed onto a steel panel primed as in Example 1, giving about a 1.8 mil thick film after baking for 30 minutes at 150° C. The craze-free temperature (CFT) and the water-spot-free temperatures (WSFT) are determined by using the same test procedure as in Example 1. This composition has a CFT and WSFT similar to coating composition A of Example 1 and exhibits an excellent balance of these two important properties.

What is claimed is:

1. A liquid coating composition having as the essential organic film-forming material a compatible mixture comprising
   (a) 60–90% by weight based on the weight of the film-forming material of a methacrylate polymer having attached to the backbone 0.2–1.2% by weight of said methacrylate polymer of pendent hydroxyl groups, 0.6–3.5% by weight of said polymer of pendent nitrile groups, and 0.01–2% by weight of pendent carboxyl groups;
   (b) 20–40% by weight of cellulose acetate butyrate;
   (c) 2–10% by weight of sucrose benzoate; and
   (d) 0–10% by weight of an organic plasticizer;
said film-forming materials being in solution of a volatile organic liquid which includes at least one solvent for said film-forming components.

2. The coating composition of claim 1 in which the methacrylate polymer has a relative viscosity of about 1.1–1.3, and a glass transition temperature of about 50–100° C., and consists essentially of esters of methacrylic acid and acrylic acid, said esters being of a $C_1$ to $C_8$ saturated aliphatic monohydric primary alcohol; and in which the cellulose acetate butyrate has a viscosity of about 0.1–20 seconds as measured according to ASTM D–1343–56 and in which the organic plasticizer is selected from the group consisting of a functional polymeric plasticizer, a volatile nonfunctional monomeric plasticizer or a mixture of a functional polymeric plasticizer and a, volatile nonfunctional monomeric plasticizer.

3. The coating composition of claim 2 in which the methacrylate polymer consists essentially of 40–80% by weight based on the weight of said polymer of a lower alkyl methacrylate, 2–15% by weight of acrylonitrile, 20–46% of a lower alkyl acrylate, 2–20% by weight of a hydroxyl containing compound selected from the group consisting of hydroxyalkylacrylate or hydroxyalkyl methacrylate and 0.1–3% by weight of an $\alpha,\beta$-unsaturated ethylenically unsaturated carboxylic acid.

4. The coating composition of claim 2 in which the methacrylate polymer consists essentially of about 55–65% by weight based on the weight of said polymer of a lower alkyl methacrylate, about 8–10% by weight of acrylonitrile, about 20–25% by weight of a lower alkyl acrylate, about 8–10% by weight of a hydroxyalkyl methacrylate, about 0.1 to 3% by weight of an $\alpha,\beta$-ethylenically unsaturated mono-carboxylic acid; about 25–35% by weight of cellulose acetate butyrate, 5–7% by weight of sucrose benzoate and about 2–10% by weight of a functional polymeric plasticizer.

5. The coating composition of claim 4 in which the plasticizer is a low molecular weight phthalate ester.

6. The coating composition of claim 3 containing about 2–10% by weight of a plasticizer blend of a butylbenzyl phthalate and a low molecular weight phthalate ester.

7. The coating composition of claim 3 in which the methacrylate polymer consists essentially of about 55–65% by weight based on the weight of said polymer of methyl methacrylate, about 8–10% by weight of acrylonitrile, about 20–25% by weight of butylacrylate, about 8–10% by weight of hydroxypropyl methacrylate, and about 0.1–2% by weight of methacrylic acid and contains 25–35% by weight cellulose acetate butyrate; 5–7% by weight sucrose benzoate and about 2–10% by weight of butylbenzyl phthalate.

8. The coating composition of claim 3 in which the methacrylate polymer consists essentially of about 55–65% by weight based on the weight of the polymer of methyl methacrylate, about 8–10% by weight of acrylonitrile, about 18–22% by weight of 2-ethylhexyl acrylate and about 8–10% by weight of hydroxylpropyl methacrylate, and about 0.1–2% by weight of methacrylic acid; 25–35% by weight of cellulose acetate butyrate; 5–7% by weight of sucrose benzoate, and about 2–10% by weight of butylbenzyl phthalate.

9. The coating composition of claim 2 in which the methacrylate polymer consists essentially of about 55–65% by weight based on the weight of the polymer of methyl methacrylate, about 8–10% by weight of acrylonitrile, about 38–42% by weight of butyl methacrylate, and about 8–10% by weight of hydroxypropyl methacrylate, and about 0.1–2% by weight of methacrylic acid; 25–35% by weight of cellulose acetate butyrate; 5–7% by weight of sucrose benzoate, and about 2–10% by weight of butylbenzyl phthalate.

10. The coating composition of claim 3 in which the acrylic polymer consists essentially of about 38–42% by weight based on the weight of the acrylic polymer of methyl methacrylate, about 8–10% by weight of acrylonitrile, about 38–42% by weight of butyl methacrylate and about 8–10% by weight of hydroxypropyl methacrylate, and about 0.1–2% by weight of methacrylic acid; 25–35% by weight of cellulose acetate butyrate; 5–7% by weight of sucrose benzoate, and about 2–10% by weight of butylbenzyl phthalate.

11. A coated metal substrate having in firm adherence at least on one side a primer layer and in superposed adherence to said primer layer a dried coalesced layer of the coating composition of claim 1.

References Cited

UNITED STATES PATENTS 3,076,718  2/1963  Gearhart et al.
3,198,784  8/1965  Griscom et al. _____ 106—180

HAROLD D. ANDERSON, Primary Examiner

L. M. PHYNES, Assistant Examiner

U.S. Cl. X.R.

117—74, 132, 161; 260—17.4, 23, 31.8, 881, 885

PO-1050
(5/69)

UNITED STATES PATENT OFFICE
CERTIFICATE OF CORRECTION

Patent No. U.S. 3,477,969     Dated November 11, 1969

Inventor(s)  Fred W. Parker

It is certified that error appears in the above-identified patent and that said Letters Patent are hereby corrected as shown below:

Claim 9, column 9, line 30, "38-42%" should read -- 25-28% --.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents